US012689715B2

(12) United States Patent (10) Patent No.: US 12,689,715 B2
Lu et al. (45) Date of Patent: Jul. 21, 2026

(54) PROJECTION APPARATUS

(71) Applicant: Coretronic Corporation, Hsin-Chu (TW)

(72) Inventors: Chun-Hsin Lu, Hsin-Chu (TW); Jen-Wei Kuo, Hsin-Chu (TW); Wen-Chieh Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 287 days.

(21) Appl. No.: 18/454,803

(22) Filed: Aug. 24, 2023

(65) Prior Publication Data

US 2024/0073378 A1 Feb. 29, 2024

(30) Foreign Application Priority Data

Aug. 29, 2022 (CN) .......................... 202211039681.3

(51) Int. Cl.
*H04N 9/31* (2006.01)

(52) U.S. Cl.
CPC ......... *H04N 9/3152* (2013.01); *H04N 9/3167* (2013.01); *H04N 9/317* (2013.01); *H04N 9/3197* (2013.01)

(58) Field of Classification Search
CPC .... H04N 9/3152; H04N 9/3167; H04N 9/317; H04N 9/3197
USPC .......................................................... 353/31
See application file for complete search history.

(56) References Cited

U.S. PATENT DOCUMENTS

| | | | |
|---|---|---|---|
| 2003/0043468 A1 | 3/2003 | Cha | |
| 2003/0128342 A1 | 7/2003 | Wada et al. | |
| 2008/0106703 A1 | 5/2008 | Miyazawa | |
| 2008/0309888 A1* | 12/2008 | Giorgi | G03B 21/20 353/99 |

(Continued)

FOREIGN PATENT DOCUMENTS

| | | |
|---|---|---|
| CN | 1089447 | 8/2002 |
| CN | 1398361 | 2/2003 |

(Continued)

OTHER PUBLICATIONS

Translation of EP 3543597-A1 (Year: 2025).*
"Office Action of China Counterpart Application", issued on Apr. 10, 2026, pp. 1-17.

*Primary Examiner* — Jerry L Brooks
(74) *Attorney, Agent, or Firm* — JCIPRNET

(57) ABSTRACT

A projection apparatus including a light source module, an eccentric-collimating lens, a prism lens group, a light valve and a projection lens is provided. The light source module is configured to provide an illumination light beam. The eccentric-collimating lens is disposed between the light sources and the light valve on a transmission path of the illumination light beam. The light valve is configured to convert the illumination light beam into an image light beam. The projection lens is configured to project the image light beam out of the projection apparatus. A first included angle between a first transmission direction of the illumination light beam incident on the eccentric-collimating lens and a central axis of the eccentric-collimating lens is greater than 0. The first transmission direction and a second transmission direction of the image beam exiting from the light valve are perpendicular to each other.

11 Claims, 8 Drawing Sheets

(56) References Cited

U.S. PATENT DOCUMENTS

| | | | |
|---|---|---|---|
| 2010/0165307 A1* | 7/2010 | Mizushima ........ | G02B 27/0961 359/629 |
| 2015/0055100 A1 | 2/2015 | Kaneda | |
| 2019/0302585 A1* | 10/2019 | Deng ................. | G03B 21/2066 |
| 2020/0301263 A1* | 9/2020 | Li ........................ | G03B 21/008 |

FOREIGN PATENT DOCUMENTS

| | | | | |
|---|---|---|---|---|
| CN | 1403847 | 3/2003 | | |
| CN | 101101437 | 1/2008 | | |
| CN | 102052605 | 5/2011 | | |
| CN | 110764348 | 2/2020 | | |
| CN | 111722463 | 9/2020 | | |
| CN | 111722464 | 9/2020 | | |
| CN | 112114480 | 12/2020 | | |
| CN | 113031382 | 6/2021 | | |
| CN | 113589629 | 11/2021 | | |
| CN | 113589635 | 11/2021 | | |
| EP | 3543597 A1 * | 9/2019 | ............. | F21S 45/43 |
| JP | H09160128 | 6/1997 | | |
| JP | 2000098272 | 4/2000 | | |
| JP | 2003177351 | 6/2003 | | |
| TW | 202001403 | 1/2020 | | |

* cited by examiner

PROJECTION APPARATUS

CROSS-REFERENCE TO RELATED APPLICATION

This application claims the priority benefit of China application serial no. 202211039681.3, filed on Aug. 29, 2022. The entirety of the above-mentioned patent application is hereby incorporated by reference herein and made a part of this specification.

BACKGROUND

Technical Field

The invention relates to a display apparatus, and particularly relates to a projection apparatus.

Description of Related Art

At present, an optical structure of a micro projector mainly adopts light emitting diodes or laser diodes that may generate light beams of different colors as high brightness light sources of the projector. An image light beam is projected out of the projector by a projection lens through optical elements. At present, an overall structure volume of the projector may not be reduced, which increases cost and makes an appearance structural design difficult. Furthermore, since a conventional coating process may not achieve an effect that a transmittance of light beam in an S-polarization direction is the same as a transmittance thereof in a P-polarization direction, one of the polarization directions have a higher transmittance, which results in a lower brightness of one of red light, blue light, and green light with different polarization directions in the laser light source, and causes poor color uniformity of the image light beam.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection apparatus. In an embodiment of the invention, the projection apparatus uses an eccentric-collimating lens to partially incline an optical path, so as to help reducing a structure volume of the projection apparatus, thereby reducing cost and improving a degree of freedom of an appearance structural design. In another embodiment of the invention, the projection apparatus uses a half-wave plate, which is adapted to solve the problem of poor color uniformity of image light beam caused by a lower brightness of one of red light, blue light, and green light with different polarization directions in a light source (particularly a laser light source).

Other objects and advantages of the invention may be further illustrated by the technical features broadly embodied and described as follows.

In order to achieve one or a portion of or all of the objects or other objects, an embodiment of the invention provides a projection apparatus including a light source module, an eccentric-collimating lens, a prism lens group, a light valve and a projection lens. The light source module is configured to provide an illumination light beam. The eccentric-collimating lens is disposed between the light source module and the light valve on a transmission path of the illumination light beam. The light valve is disposed on the transmission path of the illumination light beam and configured to convert the illumination light beam into an image light beam. The projection lens is disposed on a transmission path of the image light beam and configured to project the image light beam out of the projection apparatus. The prism lens group is disposed between the eccentric-collimating lens and the light valve on the transmission path of the illumination light beam, and is disposed between the light valve and the projection lens on the transmission path of the image light beam. A first included angle between a first transmission direction of the illumination light beam incident on the eccentric-collimating lens and a central axis of the eccentric-collimating lens is greater than 0. The first transmission direction and a second transmission direction of the image light beam exiting from the light valve are perpendicular to each other.

In an embodiment of the invention, the first included angle is within a range of 7 degrees to 20 degrees.

In an embodiment of the invention, a second included angle between a third transmission direction of the illumination light beam exiting from the eccentric-collimating lens and the first transmission direction is greater than 0.

In an embodiment of the invention, an included angle between a fourth transmission direction of the illumination light beam incident to the prism lens group and the second transmission direction is less than 90 degrees.

In an embodiment of the invention, the light source module includes a first light source, a second light source and a third light source, which are respectively configured to emit a first light beam, a second light beam and a third light beam. The projection apparatus further includes a half-wave plate. At least one of the first light beam, the second light beam and the third light beam forms the illumination light beam. The first light beam is a red light beam. The half-wave plate is disposed between the first light source and the eccentric-collimating lens on a transmission path of the red light beam, and is arranged at a light exit of the first light source.

In an embodiment of the invention, the first light source, the second light source and the third light source are disposed on a surface of a substrate, and a normal direction of the surface of the substrate is parallel to a fifth transmission direction, the fifth transmission direction is perpendicular to the first transmission direction.

In an embodiment of the invention, the projection apparatus further includes a first reflecting mirror disposed between the eccentric-collimating lens and the light source module on the transmission path of the illumination light beam.

In an embodiment of the invention, the projection apparatus further includes a light guide module, the light guide module includes a dichroic mirror and a reflecting mirror, a normal direction of the first reflecting mirror is parallel to a normal direction of the dichroic mirror and a normal direction of the reflecting mirror.

In an embodiment of the invention, the projection apparatus further includes a light guide module, the light guide module includes a dichroic mirror and a reflecting mirror, a normal direction of the first reflecting mirror is not parallel to a normal direction of the dichroic mirror and a normal direction of the mirror.

In an embodiment of the invention, the projection apparatus further includes a light homogenizing element and a light guide module, and the light homogenizing element is disposed between the light guide module and the eccentric-collimating lens on the transmission path of the illumination light beam.

In an embodiment of the invention, the projection apparatus further includes a diffusing element, and the diffusing element is disposed between the light homogenizing element and the light guide module.

In order to achieve one or a portion of or all of the objects or other objects, an embodiment of the invention provides a projection apparatus including a light source module, a half-wave plate, a light guide module, a prism lens group, a light valve and a projection lens. The light source module includes a first light source, a second light source and a third light source, which are respectively configured to emit a first light beam, a second light beam and a third light beam. The first light beam is a red light beam, the half-wave plate is disposed on a transmission path of the red light beam, and at least one of the first light beam, the second light beam and the third light beam forms an illumination light beam. The light valve is disposed on a transmission path of the illumination light beam and configured to convert the illumination light beam into an image light beam, and the projection lens is arranged on a transmission path of the image light beam and configured to project the image light beam out of the projection apparatus. The prism lens group is disposed between the light guide module and the light valve on the transmission path of the illumination light beam, and is disposed between the light valve and the projection lens on the transmission path of the image light beam.

Based on the above description, in an embodiment of the invention, the projection apparatus includes an eccentric-collimating lens, and is designed as that the illumination light beam passes through the eccentric-collimating lens in a manner of deviating from a central axis of the eccentric-collimating lens, so that the first included angle between the first transmission direction of the illumination light beam incident to the eccentric-collimating lens and the central axis of the eccentric-collimating lens is greater than 0, and the first transmission direction and the second transmission direction of the image light beam exiting from the light valve are perpendicular to each other. Therefore, a system structure volume of the projection apparatus may be further reduced, thereby reducing the cost and improving a degree of freedom in the appearance structural design. In addition, in an embodiment of the invention, the projection apparatus further includes a half-wave plate, which is designed to be disposed between the first light source and the dichroic mirror on the transmission path of the first light beam (the red light beam), and is arranged at the light exit of the first light source, which may solve the problem of poor color uniformity of image light beam caused by lower brightness of one of red light, blue light, and green light with different polarization directions in the light source (particularly a laser light source).

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
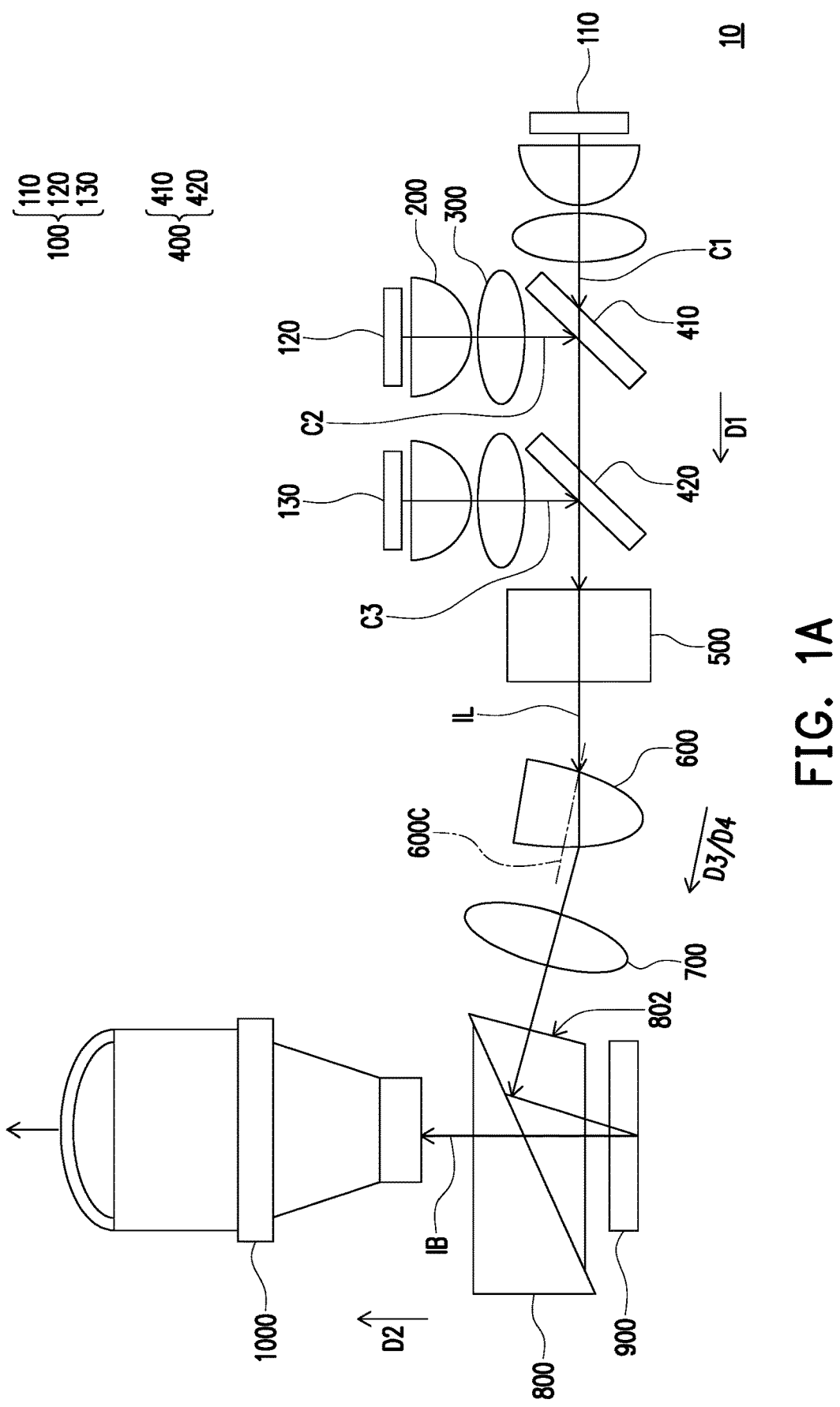
FIG. 1A is a schematic diagram of a projection apparatus according to a first embodiment of the invention.
Figure 1B:
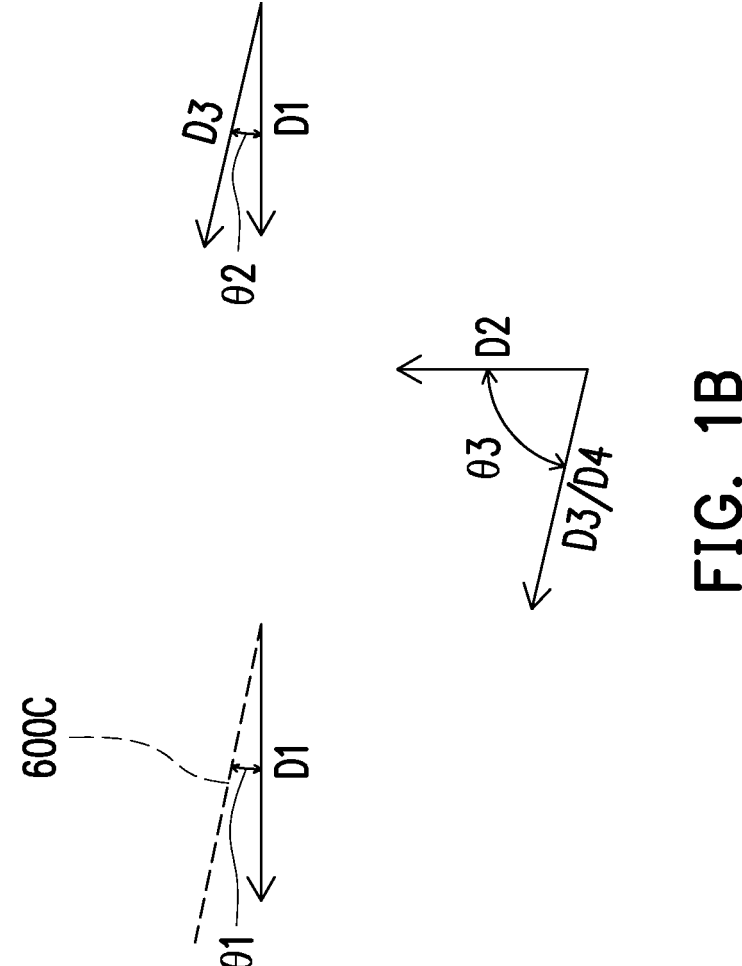
FIG. 1B is a schematic diagram of a relationship between first, second, third, and fourth transmission directions and a central axis of an eccentric-collimating lens in FIG. 1A.

FIG. 1A is a schematic diagram of a projection apparatus according to a first embodiment of the invention. FIG. 1B is a schematic diagram of a relationship between a first, second, third, and fourth transmission directions and a central axis of an eccentric-collimating lens in FIG. 1A. Referring to FIG. 1A and FIG. 1B, the embodiment provides a projection apparatus (projector) 10, which includes a light source module 100, an eccentric-collimating lens 600, a prism lens group 800, a light valve 900 and a projection lens 1000.

In the embodiment, the light source module 100 is configured to provide an illumination light beam IL. As shown in FIG. 1A, the light source module 100 may include a first light source 110, a second light source 120 and a third light source 130, which are respectively configured to emit a first light beam C1, a second light beam C2 and a third light beam C3. The illumination light beam IL includes at least one of the first light beam C1, the second light beam C2 and the third light beam C3. The first light source 110, the second light source 120 and the third light source 130 may be light emitting diodes (LEDs), laser diodes (LDs) or a combination thereof. The first light beam C1, the second light beam C2 and the third light beam C3 may be respectively a red light beam, a green light beam and a blue light beam, but the invention is not limited thereto.

In the embodiment, the light valve 900 is, for example, a spatial light modulator such as a digital micro-mirror device (DMD) or a liquid-crystal-on-silicon panel (LCOS panel). In addition, the projection lens 1000 is, for example, a combination of one or more optical lenses having a diopter. The optical lenses include, for example, various combinations of non-planar lenses such as a biconcave lens, a biconvex lens, a concavo-convex lens, a convexo-concave lens, a plano-convex lens, a plano-concave lens, etc. The invention does not limit the pattern and type of the projection lens 1000.

In the embodiment, the eccentric-collimating lens 600 is disposed between the light source module 100 and the light valve 900 on the transmission path of the illumination light beam IL. The light valve 900 is disposed on the transmission path of the illumination light beam IL, and is configured to convert the illumination light beam IL into an image light beam IB. The projection lens 1000 is disposed on a transmission path of the image light beam IB, and is configured to project the image light beam IB out of the projection apparatus 10.

In the embodiment, the prism lens group 800 may be a total internal reflection prism group (TIR prism group) composed of two prisms. The prism lens group 800 is disposed between the eccentric-collimating lens 600 and the light valve 900 on the transmission path of the illumination light beam IL, and is disposed between the light valve 900 and the projection lens 1000 on the transmission path of the image light beam IB. The projection apparatus further includes a light guide module 400. The prism lens group 800 is disposed between the light guide module 400 and the light valve 900 on the transmission path of the illumination light beam IL. The illumination light beam IL from the eccentric-collimating lens 600 enters the prism lens group 800 and is reflected to the light valve 900 by the prism lens group 800. After the illumination light beam IL is converted into the image light beam IB by the light valve 900, the image light beam IB enters and passes through the prism lens group 800 and is then transmitted to the projection lens 1000.

In the embodiment, there is a first included angle θ1 between a first transmission direction D1 of the illumination light beam IL incident on the eccentric-collimating lens 600 and a central axis 600C of the eccentric-collimating lens 600, where the first included angle θ1 is greater than 0. Generally, the central axis 600C may be defined as an axis on a geometric center of the eccentric-collimating lens 600.

Namely, the illumination light beam IL is designed to pass through the eccentric-collimating lens 600 in a manner of deviating from the central axis 600C after being incident to the eccentric-collimating lens 600, so that the illumination light beam IL may be deflected by the eccentric-collimating lens 600.

In the embodiment, the first included angle θ1 is within a range of 7 degrees to 20 degrees.

In the embodiment, the first transmission direction D1 and a second transmission direction D2 of the image light beam IB exiting from the light valve 900 are perpendicular to each other.

In the embodiment, a second included angle θ2 between a third transmission direction D3 of the illumination light beam IL exiting from the eccentric-collimating lens 600 and the first transmission direction D1 is greater than 0.

In the embodiment, an included angle θ3 between a fourth transmission direction D4 of the illumination light beam IL incident to the prism lens group 800 and the second transmission direction D2 is less than 90 degrees. In the embodiment, an included angle between a light incident surface 802 (shown in FIG. 1A) of the prism lens group 800 and the second transmission direction D2 is less than 90 degrees. In FIG. 1A and FIG. 1B, the third transmission direction D3 and the fourth transmission direction D4 are coincided, for example.

In the embodiment, the projection apparatus 10 further includes a plurality of condensing lenses 200, a plurality of collimating lenses 300 and the light guide module 400. The condensing lenses 200 and the collimating lenses 300 are disposed between the light source module 100 and the light guide module 400, and are respectively disposed on transmission paths of the first light beam C1, the second light beam C2 and the third light beam C3. The light guide module 400 is configured to guide the first light beam C1, the second light beam C2 and the third light beam C3 to the eccentric-collimating lens 600. The light guide module 400 includes dichroic mirrors 410 and 420, where the dichroic mirror 410 is disposed on the transmission path of the first light beam C1 and the second light beam C2, and the dichroic mirror 420 is disposed on the transmission path of the first light beam C1, the second light beam C2 and the third light beam C3. The dichroic mirror 410 is configured to allow red light to pass through and reflect green light. The dichroic mirror 420 is configured to allow red light and green light to pass through and reflect blue light. The first light beam C1 sequentially passes through the condensing lens 200, the collimating lens 300, the dichroic mirror 410 and the dichroic mirror 420, and is then transmitted to the eccentric-collimating lens 600. The second light beam C2 sequentially passes through the condensing lens 200 and the collimating lens 300, and is reflected to the dichroic mirror 420 by the dichroic mirror 410, and then passes through the dichroic mirror 420 and is transmitted to the eccentric-collimating lens 600. The third light beam C3 sequentially passes through the condensing lens 200 and the collimating lens 300, and is reflected to the eccentric-collimating lens 600 by the dichroic mirror 420.

In the embodiment, the projection apparatus 10 further includes a light homogenizing element 500. The light homogenizing element 500 is disposed between the light guide module 400 and the eccentric-collimating lens 600 on the transmission path of the illumination light beam IL. The light homogenizing element 500 is, for example, an integration rod (Integration Rod), a lens array, or other optical elements having a light homogenizing effect.

In the embodiment, the projection apparatus 10 further includes a lens 700. The lens 700 is disposed between the eccentric-collimating lens 600 and the prism lens group 800 on the transmission path of the illumination light beam IL. The lens 700 may be a condensing lens or an eccentric-collimating lens. When the lens 700 is used as an eccentric-collimating lens, the illumination light beam IL deflected by the eccentric-collimating lens 600 is deflected again by the lens 700, so that the third transmission direction D3 and the fourth transmission direction D4 are not coincided.

Based on the above description, in an embodiment of the invention, the projection apparatus 10 includes the eccentric-collimating lens 600, and is designed as that the illumination light beam IL passes through the eccentric-collimating lens 600 in a manner of deviating from the central axis 600C of the eccentric-collimating lens 600 after being incident to the eccentric-collimating lens 600, so that the first included angle θ1 between the first transmission direction D1 of the illumination light beam IL incident to the eccentric-collimating lens 600 and the central axis 600C of the eccentric-collimating lens 600 is greater than 0, and the first transmission direction D1 and the second transmission direction D2 of the image light beam IB exiting from the light valve 900 are perpendicular to each other. Namely, by using the eccentric-collimating lens 600 to deflect an optical path of the illumination light beam IL to compensate for an optical path difference of different positions (an optical path difference caused by the prism lens group 800) to make the illumination light beam IL incident to the prism lens group 800 at a suitable angle, the projection apparatus 10 does not need to use additional reflecting mirrors to divert the optical path. Moreover, the first transmission direction D1 and the second transmission direction D2 are perpendicular to each other, which helps to reduce the system structure volume, thereby reducing the cost and improving the degree of freedom in the appearance structural design. In addition, the above-mentioned design may not only compensate the optical path difference caused by the prism lens group 800, but also improve the uniformity of the image beam IB at the same time.

Figure 2A:
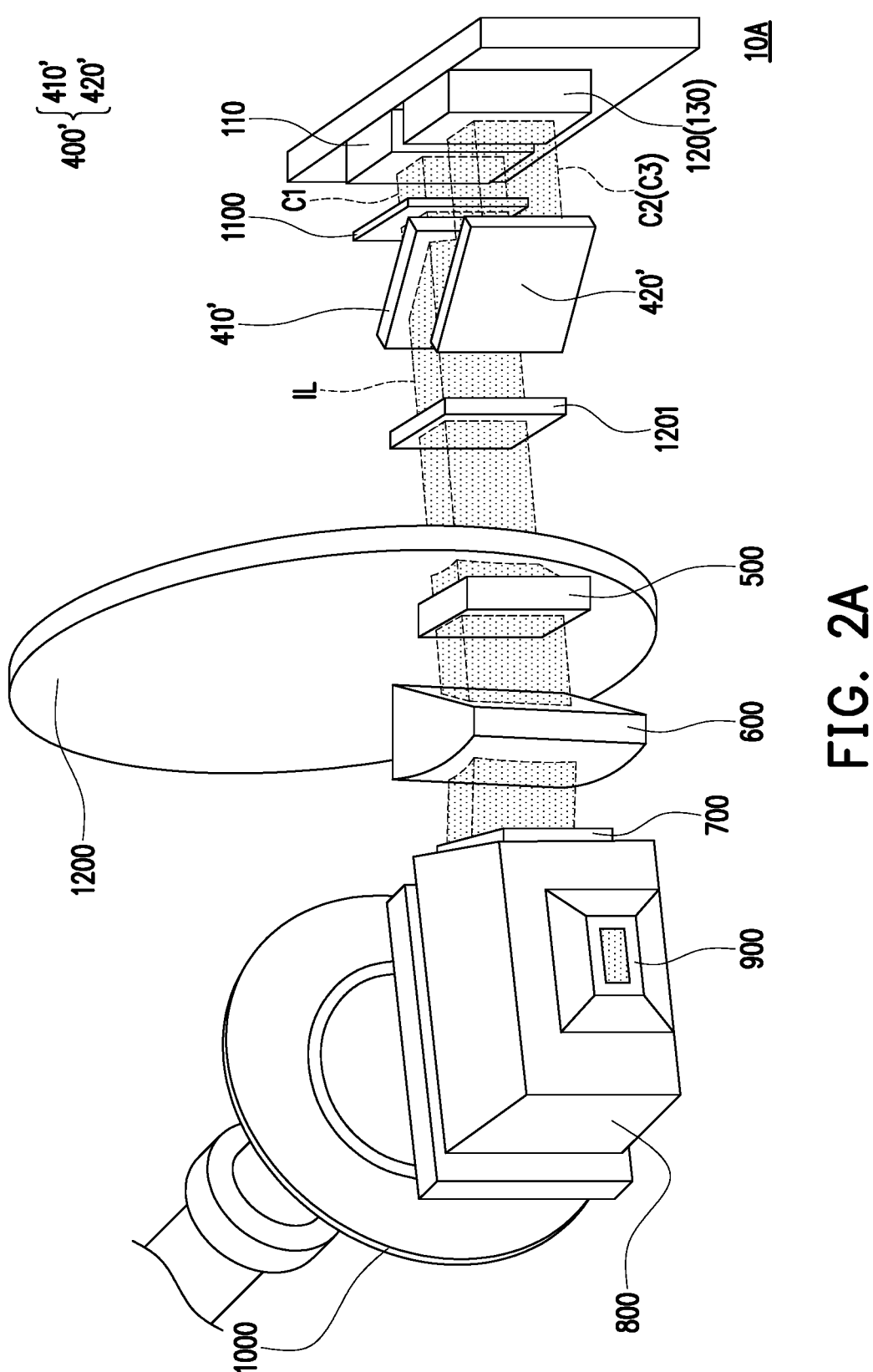
FIG. 2A is a schematic three-dimensional view of a projection apparatus according to a second embodiment of the invention.
Figure 2B:
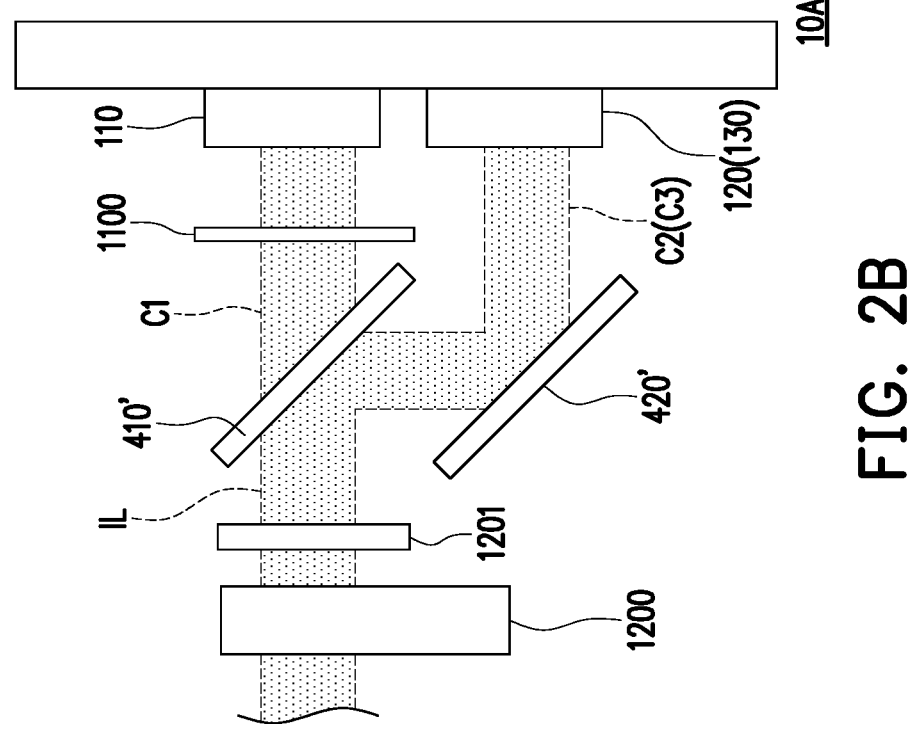
FIG. 2B is a top view of FIG. 2A.

FIG. 2A is a schematic three-dimensional view of a projection apparatus according to a second embodiment of the invention. FIG. 2B is a top view of FIG. 2A. Referring to FIG. 2A and FIG. 2B, a projection apparatus 10A is substantially the same as the projection apparatus 10 of FIG. 1A, and a main difference there between is that the projection apparatus 10A further includes a half-wave plate 1100. In the embodiment, the half-wave plate 1100 is disposed between the first light source 110 and the dichroic mirror 410 on the transmission path of the first light beam C1 (red light beam), and is disposed at the light exit of the first light source 110.

In the embodiment, a light guide module 400' includes a dichroic mirror 410' and a reflecting mirror 420'. The dichroic mirror 410' is disposed on the transmission path of the first light beam C1, the second light beam C2 and the third light beam C3, and the reflecting mirror 420' is disposed on the transmission path of the second light beam C2 and the third light beam C3. The second light beam C2 and the third light beam C3 are sequentially reflected by the reflecting mirror 420' and the dichroic mirror 410' and then transmitted to the light homogenizing element 500. The first light beam C1 passes through the dichroic mirror 410' and is then transmitted to the light homogenizing element 500. The dichroic mirror 410' is configured to allow red light to pass through and reflect green light and blue light.

In the embodiment, the projection apparatus 10A further includes a diffusing element 1200. The diffusing element 1200 may be a diffuser wheel. The diffusing element 1200 is disposed between the light homogenizing element 500 and the light guide module 400'. The diffusing element 1200 is configured to homogenize the passing-through illumination light beam IL and destroys generation of a laser speckle, which helps to mitigate a problem of uneven laser speckle of the illumination light beam IL. Therefore, an image effect presented by the projection apparatus 10A is better. The projection apparatus 10A further includes a diffusing sheet 1201 disposed between the light guide module 400' and the light homogenizing element 500. The diffusing sheet 1201 is, for example, a diffuser. The diffusing sheet 1201 is configured to transmit the illumination light beam IL formed by at least one of the first light beam C1, the second light beam C2 and the third light beam C3 to the light homogenizing element 500, and homogenize the passing-through illumination light beam IL and destroy generation of the laser speckle.

Based on the above description, in the embodiment, the projection apparatus 10A is provided with the half-wave plate 1100 on the transmission path of the first light beam C1 (red light beam) for changing a polarization direction of the red light beam C1. In an embodiment, the polarization direction of the first light beam C1 after passing through the half-wave plate 1100 is the same as a polarization direction of the second light beam C2 and the third light beam C3. Since an optical effect produced by an optical film of each optical element in the optical system is related to the polarization direction of light, setting of the half-wave plate 1100 helps to make the uniformity and brightness of the illumination light beam IL and the image light beam IB better. The half-wave plate 1100 is designed to be disposed on the transmission path of the red light beam C1 instead of on the transmission path of the green light beam, because it may reduce an overall brightness of the image light beam IB output by the projection apparatus 10A.

Referring to FIG. 2B, the first light source 110, the second light source 120 and the third light source 130 are disposed on a surface of a same substrate. The first light source 110 may be one red light source or a plurality of red light sources, the second light source 120 and the third light source 130 may be arranged in a same array, and the second light source 120 and the third light source 130 may also be a plurality of green light sources and blue light sources. The half-wave plate 1100 is configured to allow the red light generated by at least one red light source to pass through and convert the polarization direction of the red light.

Figure 3A:
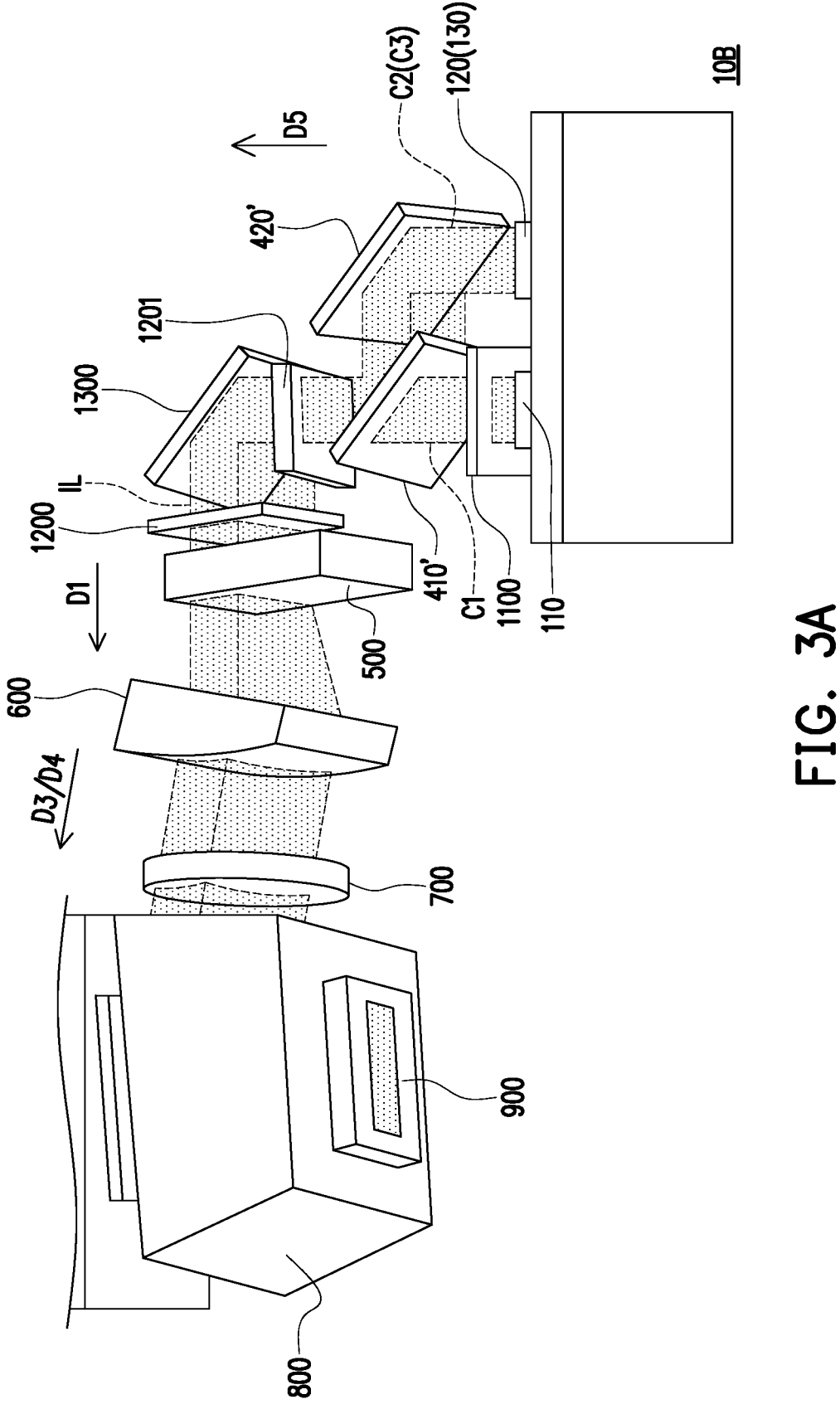
FIG. 3A is a schematic three-dimensional view of a projection apparatus according to a third embodiment of the invention.
Figure 3B:
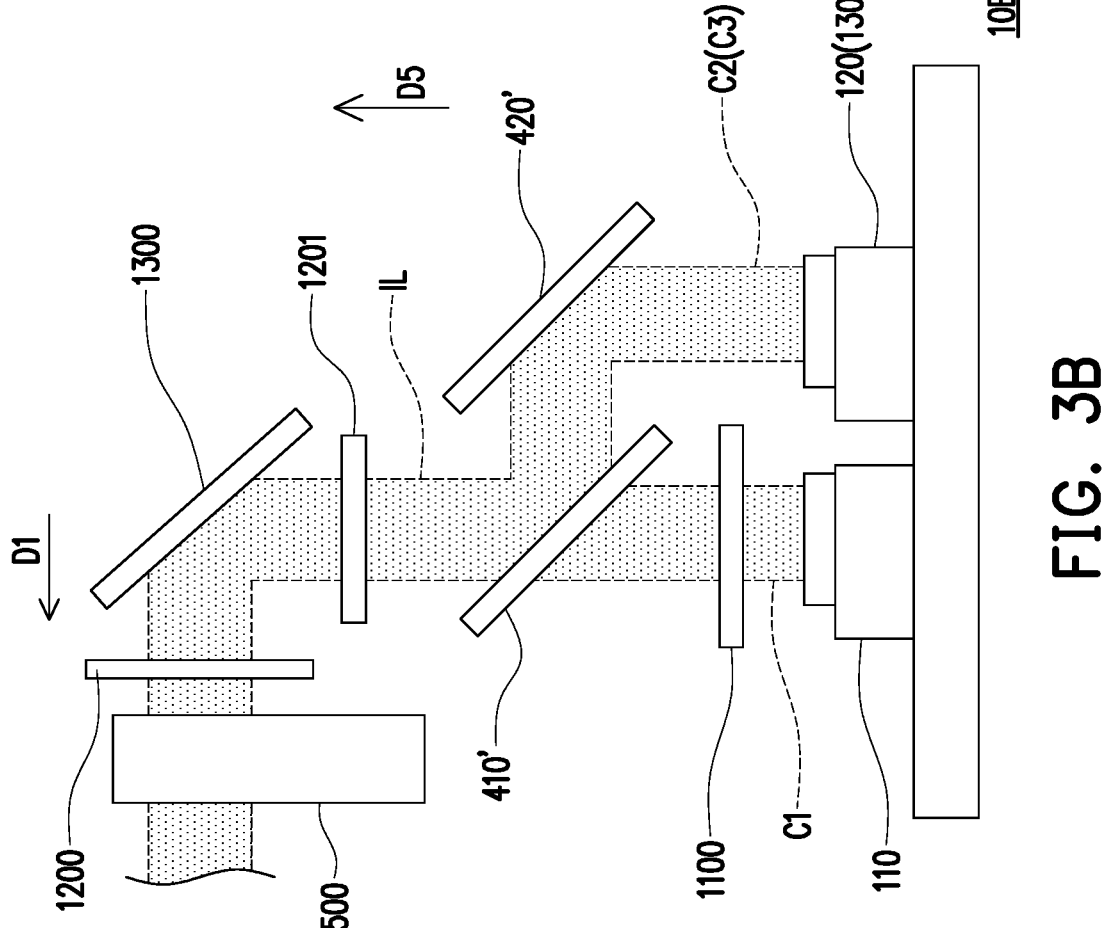
FIG. 3B is a top view of FIG. 3A.

FIG. 3A is a schematic three-dimensional view of a projection apparatus according to a third embodiment of the invention. FIG. 3B is a top view of FIG. 3A. Referring to FIG. 3A and FIG. 3B, a projection apparatus 10B is substantially the same as the projection apparatus 10A of FIG. 2A, and a main difference there between is that the projection apparatus 10B further includes a first reflecting mirror 1300, which is disposed between the light guide module 400' and the light homogenizing element 500 on the transmission path of the illumination light beam IL. The first reflecting mirror 1300 is disposed between the eccentric-collimating lens 600 and the light source module 100 on the transmission path of the illumination light beam IL.

In the embodiment, a fifth transmission direction D5 of the illumination light beam IL incident to the first reflecting mirror 1300 is perpendicular to the first transmission direction D1 of the illumination light beam IL incident to the eccentric-collimating lens 600. The first light source 110, the second light source 120 and the third light source 130 are disposed on the same surface of the same substrate, and a normal direction of the surface of the substrate is parallel to the fifth transmission direction D5. A normal direction of the first reflecting mirror 1300 is parallel to a normal direction of the dichroic mirror 410' and a normal direction of the reflecting mirror 420'. The other advantages of the projection apparatus 10B are similar to those of the projection apparatus 10A of FIG. 2A, and will not be repeated here.

Figure 4A:
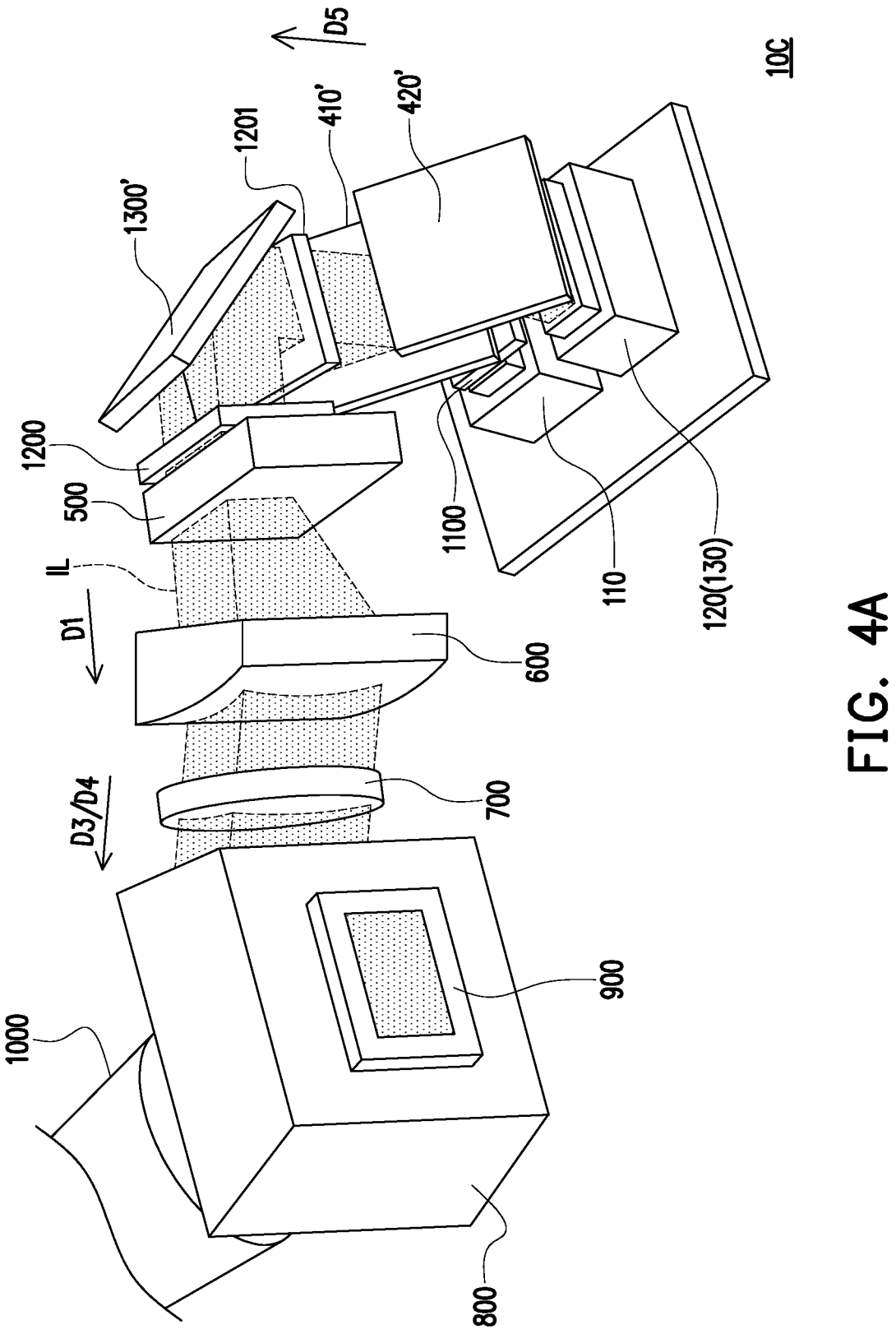
FIG. 4A is a schematic three-dimensional view of a projection apparatus according to a fourth embodiment of the invention.
Figure 4B:
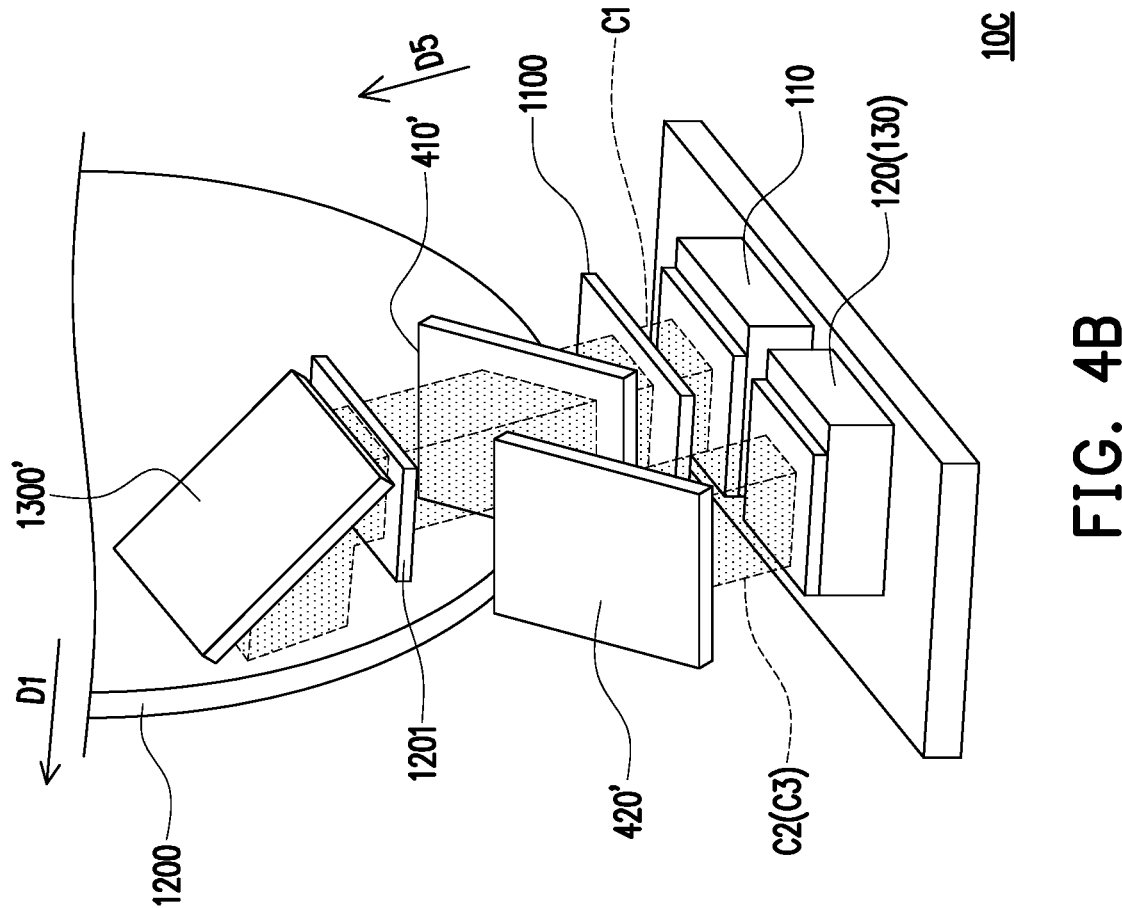
FIG. 4B is a schematic diagram of FIG. 4A from another viewing angle.

FIG. 4A is a schematic three-dimensional view of a projection apparatus according to a fourth embodiment of the invention. FIG. 4B is a schematic diagram of FIG. 4A from another viewing angle. Referring to FIG. 4A and FIG. 4B, a projection apparatus 10C is substantially the same as the projection apparatus 10B of FIG. 3A, and a main difference there between is that in the embodiment, the fifth transmission direction D5 of the illumination light beam IL incident to a first reflecting mirror 1300' is perpendicular to the first transmission direction D1 of the illumination light beam IL incident to the eccentric-collimating lens 600. The normal direction of the first reflecting mirror 1300' is not parallel to the normal direction of the dichroic mirror 410' and the normal direction of the mirror 420'. The other advantages of the projection apparatus 10C are similar to those of the projection apparatus 10B of FIG. 3A, and are not repeated here.

In summary, in an embodiment of the invention, the projection apparatus includes an eccentric-collimating lens, and is designed as that the first included angle between the first transmission direction of the illumination light beam incident to the eccentric-collimating lens and the central axis of the eccentric-collimating lens is greater than 0, and the first transmission direction and the second transmission direction of the image light beam exiting from the light valve are perpendicular to each other. Moreover, the first transmission direction and the second transmission direction are perpendicular to each other, which helps to reduce a system structure volume, thereby reducing the cost and improving the degree of freedom in appearance structural design.

In an embodiment of the invention, the projection apparatus further includes a half-wave plate, which is designed to be disposed between the first light source and the dichroic mirror on the transmission path of the first light beam (the red light beam), and is arranged at the light exit of the first light source, which may solve the problem of poor color uniformity of image light beam caused by lower brightness of one of red light, blue light, and green light with different polarization directions in the light source (particularly a laser light source).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
a light source module, an eccentric-collimating lens, a prism lens group, a light valve and a projection lens, wherein the light source module is configured to provide an illumination light beam, the eccentric-collimating lens is disposed between the light source module and the light valve on a transmission path of the illumination light beam, the light valve is disposed on the transmission path of the illumination light beam and configured to convert the illumination light beam into an image light beam, the projection lens is disposed on a transmission path of the image light beam and configured to project the image light beam out of the projection apparatus, the prism lens group is disposed between the eccentric-collimating lens and the light valve on the transmission path of the illumination light beam, and is disposed between the light valve and the projection lens on the transmission path of the image light beam, wherein:
a first included angle between a first transmission direction of the illumination light beam incident on the eccentric-collimating lens and a central axis of the eccentric-collimating lens is greater than 0; and
the first transmission direction and a second transmission direction of the image light beam exiting from the light valve are perpendicular to each other,
wherein an included angle between a fourth transmission direction of the illumination light beam incident to the prism lens group and the second transmission direction is less than 90 degrees.

2. The projection apparatus as claimed in claim 1, wherein the first included angle is within a range of 7 degrees to 20 degrees.

3. The projection apparatus as claimed in claim 1, wherein a second included angle between a third transmission direction of the illumination light beam exiting from the eccentric-collimating lens and the first transmission direction is greater than 0.

4. The projection apparatus as claimed in claim 1, wherein the light source module comprises a first light source, a second light source and a third light source respectively configured to emit a first light beam, a second light beam and a third light beam, and the projection apparatus further comprises a half-wave plate, wherein:

at least one of the first light beam, the second light beam and the third light beam forms the illumination light beam;

the first light beam is a red light beam; and the half-wave plate is disposed between the first light source and the eccentric-collimating lens on a transmission path of the red light beam, and is arranged at a light exit of the first light source.

5. A projection apparatus, comprising:

a light source module, an eccentric-collimating lens, a prism lens group, a light valve and a projection lens, wherein the light source module is configured to provide an illumination light beam, the eccentric-collimating lens is disposed between the light source module and the light valve on a transmission path of the illumination light beam, the light valve is disposed on the transmission path of the illumination light beam and configured to convert the illumination light beam into an image light beam, the projection lens is disposed on a transmission path of the image light beam and configured to project the image light beam out of the projection apparatus, the prism lens group is disposed between the eccentric-collimating lens and the light valve on the transmission path of the illumination light beam, and is disposed between the light valve and the projection lens on the transmission path of the image light beam, wherein:

a first included angle between a first transmission direction of the illumination light beam incident on the eccentric-collimating lens and a central axis of the eccentric-collimating lens is greater than 0; and the first transmission direction and a second transmission direction of the image light beam exiting from the light valve are perpendicular to each other, wherein the light source module comprises a first light source, a second light source and a third light source respectively configured to emit a first light beam, a second light beam and a third light beam, and the projection apparatus further comprises a half-wave plate, wherein:

at least one of the first light beam, the second light beam and the third light beam forms the illumination light beam;

the first light beam is a red light beam; and the half-wave plate is disposed between the first light source and the eccentric-collimating lens on a transmission path of the red light beam, and is arranged at a light exit of the first light source, wherein the first light source, the second light source and the third light source are disposed on a surface of a substrate, and a normal direction of the surface of the substrate is parallel to a fifth transmission direction, the fifth transmission direction is perpendicular to the first transmission direction.

6. The projection apparatus as claimed in claim 1, further comprising a first reflecting mirror disposed between the eccentric-collimating lens and the light source module on the transmission path of the illumination light beam.

7. The projection apparatus as claimed in claim 6, further comprising a light guide module, wherein the light guide module comprises a dichroic mirror and a reflecting mirror, a normal direction of the first reflecting mirror is parallel to a normal direction of the dichroic mirror and a normal direction of the reflecting mirror.

8. The projection apparatus as claimed in claim 6, further comprising a light guide module, wherein the light guide module comprises a dichroic mirror and a reflecting mirror, a normal direction of the first reflecting mirror is not parallel to a normal direction of the dichroic mirror and a normal direction of the mirror.

9. The projection apparatus as claimed in claim 1, further comprising a light homogenizing element and a light guide module, wherein the light homogenizing element is disposed between the light guide module and the eccentric-collimating lens on the transmission path of the illumination light beam.

10. The projection apparatus as claimed in claim 9, further comprising a diffusing element disposed between the light homogenizing element and the light guide module.

11. A projection apparatus, comprising: a light source module, a half-wave plate, a light guide module, a prism lens group, a light valve and a projection lens, wherein the light source module comprises a first light source, a second light source and a third light source respectively configured to emit a first light beam, a second light beam and a third light beam, wherein the first light beam is a red light beam, the half-wave plate is disposed on a transmission path of the red light beam, and at least one of the first light beam, the second light beam and the third light beam forms an illumination light beam, and the light valve is disposed on a transmission path of the illumination light beam and configured to convert the illumination light beam into an image light beam, and the projection lens is arranged on a transmission path of the image light beam and configured to project the image light beam out of the projection apparatus, the prism lens group is disposed between the light guide module and the light valve on the transmission path of the illumination light beam, and is disposed between the light valve and the projection lens on the transmission path of the image light beam, wherein an included angle between a fourth transmission direction of the illumination light beam incident to the prism lens group and a second transmission direction of the image light beam exiting from the light valve is less than 90 degrees.

\* \* \* \* \*